United States Patent
Fukuda et al.

(10) Patent No.: US 7,345,867 B2
(45) Date of Patent: Mar. 18, 2008

(54) CAPACITIVE PRESSURE SENSOR AND METHOD OF MANUFACTURING THE SAME

(75) Inventors: Tetsuya Fukuda, Niigata-ken (JP); Katsuya Kikuiri, Niigata-ken (JP); Kiyoshi Sato, Niigata-ken (JP); Yoshinobu Nakamura, Niigata-ken (JP); Hiroyuki Kobayashi, Niigata-ken (JP)

(73) Assignee: Alps Electric Co., Ltd, Tokyo (JP)

( * ) Notice: Subject to any disclaimer, the term of this patent is extended or adjusted under 35 U.S.C. 154(b) by 0 days.

(21) Appl. No.: 11/558,602

(22) Filed: Nov. 10, 2006

(65) Prior Publication Data

US 2007/0115609 A1  May 24, 2007

(30) Foreign Application Priority Data

Nov. 18, 2005  (JP) .............................. 2005-334155

(51) Int. Cl.
*H01G 7/00* (2006.01)
*G01I 9/12* (2006.01)

(52) U.S. Cl. ...................... 361/283.1; 73/718
(58) Field of Classification Search ................ 361/277, 361/280, 283.1, 283.2, 283.3, 283.4
See application file for complete search history.

(56) References Cited

U.S. PATENT DOCUMENTS

| 5,545,594 A | 8/1996 | Cahill |
| 5,656,781 A * | 8/1997 | Kankkunen ................... 73/724 |
| 5,801,313 A * | 9/1998 | Horibata et al. .............. 73/718 |
| 7,002,787 B2 * | 2/2006 | Nakayama ................... 361/277 |
| 2003/0223176 A1 * | 12/2003 | Fujii et al. ................... 361/277 |

FOREIGN PATENT DOCUMENTS

| JP | 277211 | 4/1998 |
| JP | 2000-74768 | 3/2000 |

* cited by examiner

*Primary Examiner*—Eric Thomas
(74) *Attorney, Agent, or Firm*—Brinks Hofer Gilson & Lione

(57) ABSTRACT

A capacitive pressure sensor and method of manufacturing the same is provided. The capactive pressure sensor includes a glass substrate that has a pair of surfaces opposite to each other. A recessed portion is provided to form a cavity on one of the pair of principal surfaces. A first protruding portion provided in the recessed portion. A first silicon substrate has a fixed electrode formed on the first protruding portion, and a movable electrode disposed with a predetermined interval between the fixed electrode and the movable electrode.

4 Claims, 4 Drawing Sheets

CAPACITIVE PRESSURE SENSOR AND METHOD OF MANUFACTURING THE SAME

This patent document claims the benefit of Japanese Patent Application No. 2005-334155 filed on Nov. 18, 2005, which hereby is incorporated by reference.

BACKGROUND

1. Field

The present embodiments relate to a capacitive pressure sensor and a method of manufacturing the same. The present embodiments are operative with various sensors and gauges. For example, the present embodiments are operative with a barometer for monitoring an atmospheric pressure or a capacitive pressure sensor for monitoring a gas pressure.

2. Related Art

Generally, a capacitive pressure sensor is configured such that a substrate having a diaphragm corresponding to a movable electrode is bonded to a substrate having a fixed electrode with a predetermined gap (cavity) between the diaphragm and the fixed electrode. For example, a capacitive pressure sensor is disclosed in Japanese Patent No. 2772111. In this capacitive pressure sensor according to the related art, if pressure is applied to a diaphragm, the diaphragm deforms, which results in varying an interval between the diaphragm and a fixed electrode. As the interval between the diaphragm and the fixed electrode varies, an electrostatic capacitance between the diaphragm and the fixed electrode varies. The variation in the pressure is detected by using the variation in the electrostatic capacitance.

This capacitive pressure sensor has been required to have a small size and a small cavity gap between the fixed electrode and the movable electrode. In the capacitive pressure sensor, it has been required that high pressure be detected even when the cavity gap is small. Accordingly, the capacitive pressure sensor has been required to detect pressure with high sensitivity.

SUMMARY

The present embodiments may obviate one or more of the limitations of the related art. For example, in one embodiment, a capacitive pressure sensor is capable of detecting pressure with high sensitivity.

In one embodiment, a capacitive pressure sensor includes a glass substrate that has a pair of principal surfaces opposite to each other, a recessed portion provided to form a cavity on one of the pair of principal surfaces, and a first protruding portion provided in the recessed portion. A first silicon substrate has a fixed electrode formed on the first protruding portion, and a movable electrode disposed with a predetermined gap between the fixed electrode and the movable electrode.

In this embodiment, the fixed electrode is formed on the first protruding portion that is formed in the glass substrate. Therefore, regardless of the location of the fixed electrode, the gap between the fixed electrode and the movable electrode can be maintained at a predetermined value. As a result, the pressure can be detected with high sensitivity.

In one embodiment, the capacitive pressure sensor includes a second silicon substrate that is bonded to the other principal surface of the glass substrate, and has a second protruding portion penetrating the glass substrate to be exposed through the one principal surface. The second protruding portion is exposed in a region other than the first protruding portion in the recessed portion, and the fixed electrode is electrically connected to the second protruding portion. In this embodiment, the top surface of the second protruding portion is lower than the top surface of the first protruding portion. For example, the distance between the first silicon substrate and the first protruding portion is smaller than the distance between the first silicon substrate and the second protruding portion. The distance between the first silicon substrate and the second protruding portion is large, and thus a parasitic capacitance can be reduced. Therefore, pressure detection can be performed with higher precision.

In one embodiment, an Si—Si bond or an Si—O bond is generated at the interface between the glass substrate and the first and second silicon substrates. In this embodiment, since the Si—Si bond or the Si—O bond is generated at the interface between the glass substrate and the first and second silicon substrates, the glass and the silicon can be firmly bonded to each other. Therefore, adhesion between the glass substrate and the silicon substrates can be improved, and airtightness of the cavity that is constructed by the recessed portion and the first silicon substrate can be improved.

DETAILED DESCRIPTION

In one embodiment, a silicon substrate having protruding portions is pressed on a glass substrate under heat and pressure so as to be bonded to each other. The protruding portions are buried in the glass substrate by polishing both substrates. A capacitive pressure sensor is obtained by using the substrate with the buried portions. According to this embodiment, when the capacitive pressure sensor is manufactured using the substrate with the buried portions, a process of polishing glass and silicon at the same time may be included. In this process, it is difficult to obtain a desired shape by polishing the glass and the silicon at the same time. In a region where an electrostatic capacitance between a fixed electrode and a movable electrode is calculated, if the fixed electrode does not have a desired shape, variation may occur in an interval between the fixed electrode and the movable electrode. As a result, it is not possible to detect pressure with high sensitivity.

In one embodiment, a capacitive pressure sensor is formed without performing the process of polishing glass and silicon at the same time.

In one embodiment, a capacitive pressure sensor includes a glass substrate that has a pair of principal surfaces opposite to each other. A recessed portion for a cavity is provided on one of the pair of principal surfaces. A first protruding portion is provided in the recessed portion, and a first silicon substrate that has a fixed electrode is formed on the first protruding portion and a movable electrode is disposed with a predetermined gap between the fixed electrode and the movable electrode. Therefore, in one embodiment, it is possible to provide a capacitive pressure sensor that is capable of detecting pressure with high sensitivity.

Figure 1A:
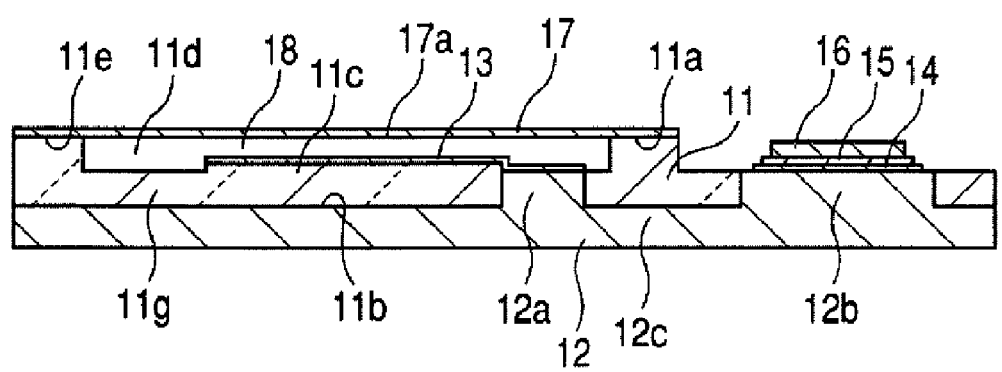
FIG. 1A is a cross-sectional view illustrating a schematic structure of a capacitive pressure sensor according to one embodiment.
Figure 1B:
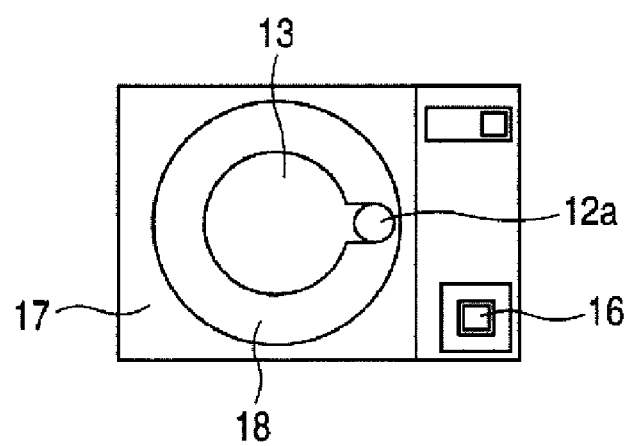
FIG. 1B is a plan view illustrating a schematic structure of a capacitive pressure sensor according to one embodiment.

FIG. 1A is a cross-sectional view illustrating a schematic structure of a capacitive pressure sensor according to one embodiment. FIG. 1B is a plan view illustrating a schematic structure of a capacitive pressure sensor according to one embodiment.

In the drawings, reference numeral 11 indicates a glass substrate. The glass substrate 11 has a pair of principal planes 11a and 11b that are opposite to each other. A silicon substrate 12 is bonded to the glass substrate 11 at the side of the principal surface 11b. In a cavity that is provided at the side of the principal surface 11a of the glass substrate 11, a protruding portion 11c is formed. Since the protruding portion 11c exists in a region where a fixed electrode is formed, the height of the protruding portion 1ic is determined according to an interval between the fixed electrode and a movable electrode.

In one embodiment, at the side of the principal surface 11a of the glass substrate 11, a recessed portion 11d that constitutes the capacity, to be described in detail below, is formed. The depth of the recessed portion 11d is set such that a predetermined cavity interval can be maintained within a range in which the fixed electrode in the cavity does not come into contact with a diaphragm, which will be described in detail below. In order to reduce a parasitic capacitance, the width of the recessed portion 11d is preferably set to be larger than at least the width of the fixed electrode. In order to reduce the parasitic capacitance as much as possible, the fixed electrode 13 is more preferably formed on only the protruding portion 11c of the recessed portion 11d. The protruding portion 11c is preferably formed at a height of 3 to 6 μm from a bottom surface of the recessed portion 11d, taking into consideration of the parasitic capacitance or the total thickness (processing time).

The silicon substrate 12 includes a protruding portion 12a that is a connection portion for a fixed electrode, and a protruding portion 12b that is a connection portion for an electrode pad. The protruding portions 12a and 12b penetrate the glass substrate 11 to be then exposed through the side of one principal surface 11a. In the silicon substrate 12, the protruding portion 12a is disposed inside the cavity, and the protruding portion 12b is disposed outside the cavity. The protruding portion 12a is disposed in a region other than the protruding portion 11c in the recessed portion 11d of the glass substrate 11 (region other than a region serving as the fixed electrode), and a top surface of the protruding portion 12a is lower than the protruding portion 11c. For example, the distance between a silicon substrate 17, to be described in detail below, and the region of the protruding portion 12a is larger than the distance between the silicon substrate 17 and the region of the protruding portion 11c.

In one embodiment, the protruding portion 12a is partially formed in a portion of a region other than the protruding portion 11c of the recessed portion 1id. The distance between the silicon substrate 17 and the protruding portion 12a is lager, and an area where the protruding portion 12a is formed is relatively smaller. Accordingly, the parasitic capacitance can be reduced, and pressure detection can be performed with high precision.

In one embodiment, a connection portion 12c for connecting the protruding portion 12a and the protruding portion 12b is formed lower than the top surfaces of the protruding portion 12a and the protruding portion 12b, and the distance between the connection portion 12c and the silicon substrate 17 is larger than the distance between the silicon substrate 17 and each of the protruding portions 12a and 12b. As a result, the parasitic capacitance can be reduced. The height of the protruding portions 12a and 12b from the top surface of the connection portion 12c is preferably about 200 μm, when taking into consideration of the parasitic capacitance.

The fixed electrode 13 is formed on the protruding portion 11c of the glass substrate 11. The fixed electrode 13 extends to a top surface of the protruding portion 12a of the silicon substrate 12 along the side surface of the protruding portion 11c. Accordingly, the fixed electrode 13 is electrically connected to the protruding portion 12a of the silicon substrate 12.

In one embodiment, the fixed electrode 13 can use a three-layered structure of, for example, Ti/Cr/Ta. The Cr is preferable because it can be used as a base layer of Ta to reduce resistance. The fixed electrode 13 can be formed by means of sputtering. The thickness of the fixed electrode 13 in an entire region thereof is preferably within a range of about 0.2 to 0.3 μm.

In one embodiment, an electrode pad 16 is formed on the protruding portion 12b with a contact layer 14 and a seed layer 15 (plated seed layer) therebetween. Since the protruding portion 12a and the protruding portion 12b are formed in the same silicon substrate 12, the fixed electrode 13 and the electrode pad 16 are electrically connected to each other through the silicon substrate 12, the contact layer 14, and the seed layer 15. The electrode pad 16 is electrically connected to an external circuit by means of a connection method, such as wire bonding.

In one embodiment, as a material that forms the contact layer 14 or the seed layer 15, a conductive material, such as a metal, may be used. In this embodiment, it is preferable to select a material in which a contact resistance with the electrode pad 16 is low. A structure of a region of the electrode pad 16 is not limited thereto, but various changes and modifications can be made.

The silicon substrate 17 having a compression diaphragm 17a that is a movable electrode of the capacitive pressure sensor is bonded to a bonding surface 11e (region other than the recessed portion lid) of the principal surface 11a of the glass substrate 11. Therefore a cavity 18 is formed between the recessed portion 11d of the glass substrate 11 and the silicon substrate 17. As a result, a capacitive capacitance is generated between the compression diaphragm 17a (movable electrode) and the fixed electrode 13.

In one embodiment, the interface (bonding surface 11e) between the glass substrate 11 and the silicon substrate 17 has strong adhesion. When the silicon substrate 17 is bonded to the glass substrate 11, the silicon substrate 17 is mounted on the bonding surface 11e of the glass substrate 11, an anode bonding process is performed, and the adhesion between the substrates 11 and 17 can be improved.

The interface between the glass substrate 11 and the silicon substrate 17 has strong adhesion, so that it is possible to maintain airtightness in the cavity 18 constructed between the diaphragm 17a and the concave portion 11d of the glass substrate 11. In the recessed portion 11d of the glass substrate 11, in a region other than the protruding portion 11c, by forming a region 11g where the distance between the silicon substrate 17 and the region 11g is large, even though the silicon substrate 17 is pulled closely to the glass substrate 11 by means of electrostatic attraction at the time of anode bonding, it can be prevented that the silicon substrate 17 and the glass substrate 11 come into contact with each other. The anode bonding is generated in the portion other than the bonding surface 11e where the silicon substrate 17 comes into contact with the glass substrate 11.

In one embodiment, since the fixed electrode 13 made of a metal exists on the protruding portion 11c, even though the protruding portion 11c comes into contact with the silicon substrate 17, it is difficult for the anode bonding to be generated.

In this embodiment, the anode boding process refers to a process in which a predetermined voltage (for example, about 300 V to 1 kV) is applied at a predetermined temperature (for example, 400° C. or less) to generate strong electrostatic attraction between the silicon and the glass. A chemical bond using oxygen is generated at the interface between the glass and the silicon in a contacting state, or a covalent bond using the discharge of oxygen is generated. The covalent bond at the interface between the glass and the silicon corresponds to a Si—Si bond between Si atoms contained in the silicon and Si atoms contained in the glass or a Si—O bond. By means of the Si—Si bond or the Si—O bond, the silicon and the glass are firmly bonded to each other, and thus strong adhesion is generated at the interface between the silicon and the glass. In order for the anode bonding to be efficiently performed, as the glass material for the glass substrate 11, a glass material (for example, Pyrex (trade mark) glass) that contains an alkali metal, such as natrium, is preferably used, but is not limited to this.

The anode bonding is preferably performed at the interface between the glass substrate 11 and the silicon substrate 12. As described in detail below, the interface between the glass substrate and the silicon substrate is formed by pressing the silicon substrate 12 on the glass substrate 11 under a heating state. The interface that is obtained by the above-mentioned method also has strong adhesion. However, after pressing the silicon substrate 12 on the glass substrate 11, the anode bonding process is performed, which further improves the adhesion.

The capacitive pressure sensor having the above-described structure has a predetermined electrostatic capacitance that is generated between the diaphragm 17a and the fixed electrode 13 formed on the protruding portion 11c of the glass substrate 11. If the pressure is applied to the capacitive pressure sensor, the diaphragm 17a moves according to the applied pressure. As a result, the diaphragm 17a is displaced. In one embodiment, the electrostatic capacitance between the diaphragm 17a and the fixed electrode 13 varies. Accordingly, by using the electrostatic capacitance as a parameter, the variation in the electrostatic capacitance may be used as the pressure variation.

In the capacitive pressure sensor, the fixed electrode 13 is formed on the protruding portion 11c that is formed in the glass substrate 11. For example, the entire region where the fixed electrode 13 is formed is made of glass, but it is not the region where the silicon and the glass are mixed with each other. Accordingly, since the silicon and the glass do not need to be simultaneously polished, it is possible to prevent the upward curved shape from being formed on the silicon, which occurs when the silicon and the glass are simultaneously polished. The top surface of the protruding portion 11c, on which the fixed electrode 13 is formed, can be formed to have a desired shape.

A method of manufacturing the capacitive pressure sensor according to the embodiment of the invention will be described with reference to the accompanying drawings. FIGS. 2A to 2C, FIGS. 3A to 3E, and FIGS. 4A and 4B are cross-sectional views illustrating the method of manufacturing the capacitive pressure sensor according to the embodiment of the invention.

Figure 2A:
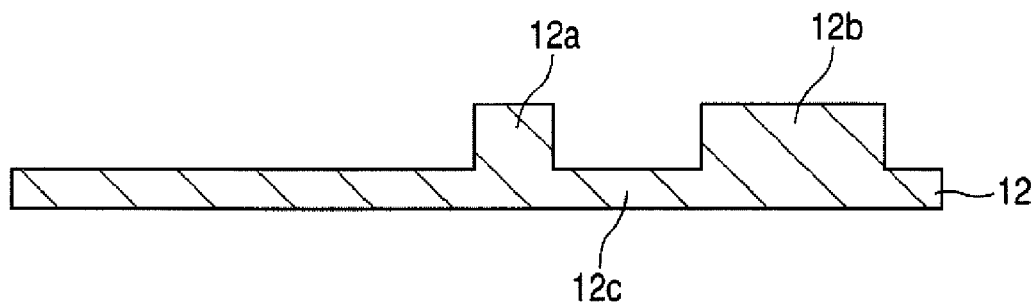
FIGS. 2A to 2C are cross-sectional views illustrating a method of manufacturing a capacitive pressure sensor according to one embodiment.

The silicon substrate 12 that is constructed to have a low resistance by doping impurities is prepared. As the impurities, n-type impurities or p-type impurities may be used. The resistivity is, for example, about 0.01 Ω·cm. As shown in FIG. 2A, protruding portions 12a and 12b are formed by etching one principal surface of the silicon substrate 12. In this embodiment, a resist film is formed on the silicon substrate 12, the resist film is patterned (subjected to a photolithographic process) such that the resist film remains in regions where the protruding portions 12a and 12b are formed, silicon is etched while using the resist film as a mask, and the remaining resist film is removed. In this way, the protruding portions 12a and 12b are provided.

Figure 2B:
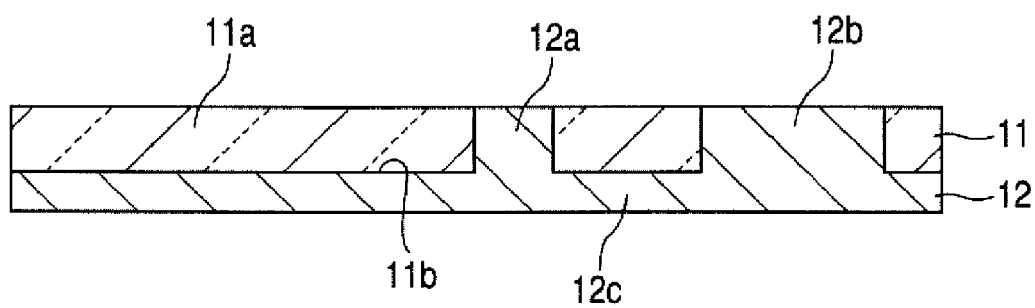

The glass substrate 11 is disposed on the silicon substrate 12 where the protruding portions 12a and 12b are formed. The silicon substrate 12 and the glass substrate 11 are heated in a vacuum, the silicon substrate 12 presses on the glass substrate 11, and the protruding portions 12a and 12b press on the principal surface 11b of the glass substrate 11. In this state, as shown in FIG. 2B, the silicon substrate 12 and the glass substrate 11 are bonded to each other. The temperature is preferably the temperature that is not more than the temperature corresponding to the melting point of the silicon, and the temperature (for example, the temperature that is not more than the temperature corresponding to the softening point of the glass) at which the glass can deform. For example, the heating temperature is about 800° C.

In order to further improve the adhesion at the interface between the protruding portions 12a and 12b of the silicon substrate 12 and the glass substrate 11, the anode bonding process is preferably performed. In this case, the anode boding process is performed as follows. Electrodes are respectively attached to the silicon substrate 12 and the glass substrate 11, and a voltage of about 300 V to 1 kV is applied thereto under a heating process at a temperature of about 400° C. or less. As a result the adhesion at the interface between the protruding portions 12a and 12b of the silicon substrate 12 and the glass substrate 11 is further improved, and airtightness of the cavity 18 in the capacitive pressure sensor can be improved.

Figure 2C:
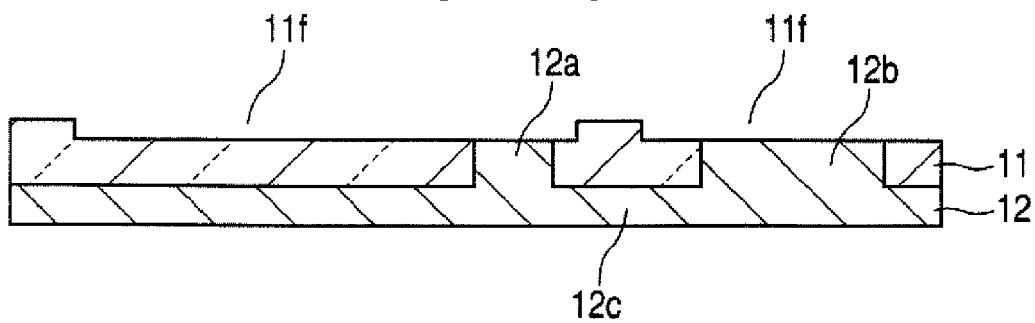
Figure 3A:
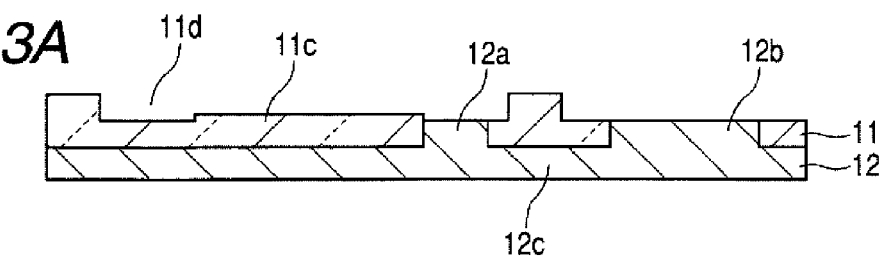
FIGS. 3A to 3E are cross-sectional views illustrating a method of manufacturing a capacitive pressure sensor according to one embodiment.

The side of the principal surface 11a of the glass substrate 11 is polished such that the protruding portions 12a and 12b of the silicon substrate 12 are exposed to the outside. As shown in FIG. 2C, for example, a milling process is performed on the glass substrate 11 and the protruding portions 12a and 12b, thereby forming a recessed portion 11f for the cavity 18. As shown in FIG. 3A, for example, a milling process is performed on a region outside the recessed portion 11f, for example, a region where the fixed electrode 13 is not provided, thereby forming a recessed portion 11d. The protruding portion 11c for forming the fixed electrode 13 is formed. Since the top surface of the protruding portion 11c is formed by the milling process, it has a substantially flat surface. Regardless of the location of the fixed electrode 13, the gap between the fixed electrode 13 and the movable electrode 17a can be maintained at a predetermined value. It is possible to detect the pressure with high sensitivity.

Figure 3B:
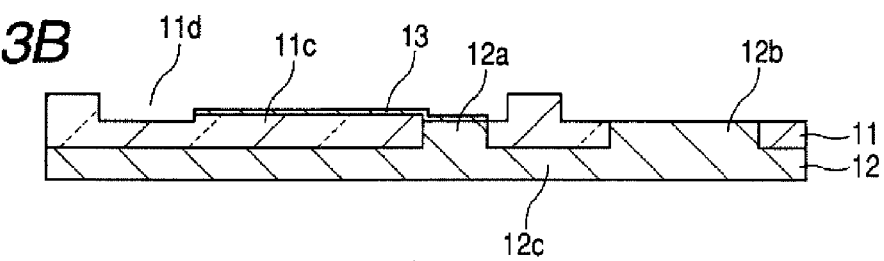

As shown in FIG. 3B, the fixed electrode 13 is formed over a range ranging from the protruding portion 11c of the glass substrate 11 to the protruding portion 12a of the silicon substrate 12. The resist film is patterned (subjected to a photolithographic process) such that the resist film remains in the fixed electrode forming region, then electrode materials are coated while using the resist film as a mask, and then the remaining resist film is removed (liftoff). The fixed electrode 13 is formed, and the fixed electrode 13 is electrically connected to the protruding portion 12a.

Figure 3C:
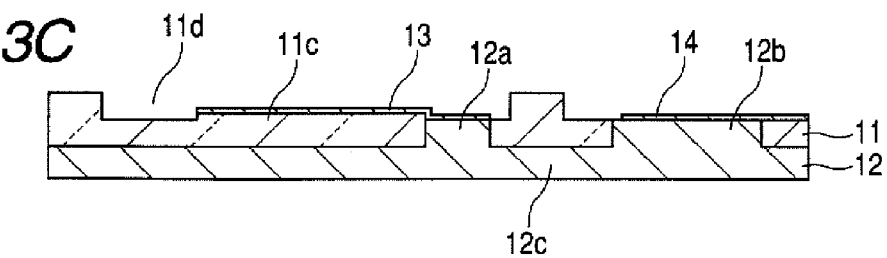

As shown in FIG. 3C, a contact layer 14 is formed on a region that contains the protruding portion 12b of the silicon substrate 12. In this case, the resist film is formed in the contact layer forming region, the contact layer is formed by means of sputtering, and the remaining resist film is removed (liftoff).

Figure 3D:
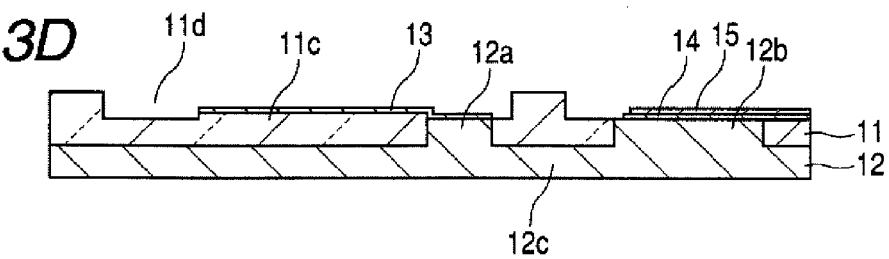

As shown in FIG. 3D, the seed layer 15 is formed on the contact layer 14. The resist film is formed in the seed layer forming region, the seed layer 15 is formed by means of sputtering, and the remaining resist film is removed (liftoff). In one embodiment, the electrode pad 16 can be formed on the seed layer 15 by plating.

Figure 3E:
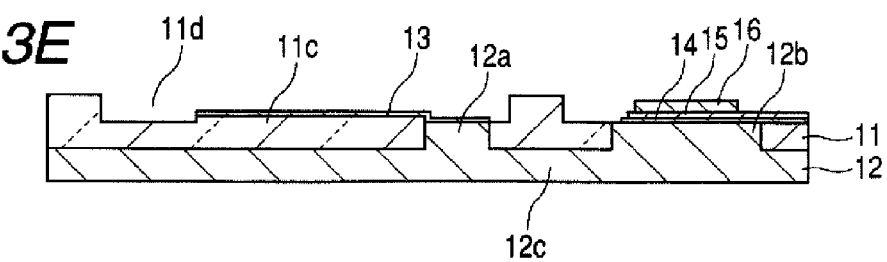
Figure 4A:
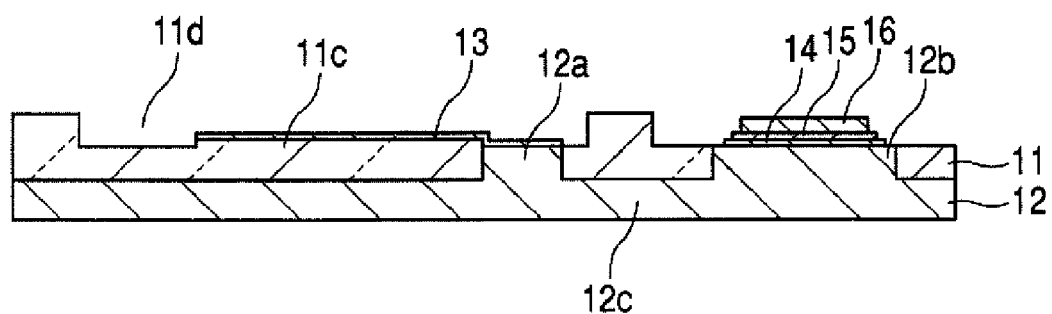
FIGS. 4A and 4B are cross-sectional views illustrating a method of manufacturing a capacitive pressure sensor according to one embodiment.

As shown in FIG. 3E, the electrode pad 16 is formed on the seed layer 15. In this embodiment, a mask is provided in a region other than the electrode pad forming region, only the electrode pad forming region is plated, and the electrode pad 16 is formed. The plating conditions are different depending on materials, but commonly used plating conditions may be used. As shown in FIG. 4A, the resist film is formed over an entire region, the resist film is patterned (subjected to a photolithographic process) such that the resist film remains in the electrode pad peripheral regions, the seed layer 15 and the contact layer 14 are etched while using the resist film as the mask, and the remaining resist film is removed.

Figure 4B:
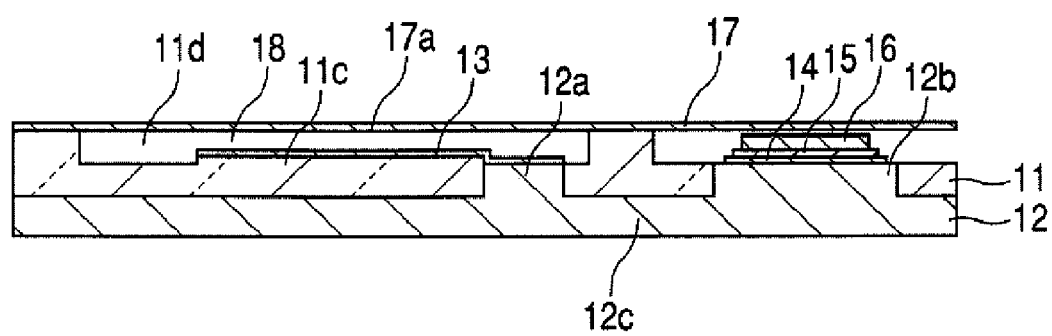

In a state in which the diaphragm 17a is made to be located with a predetermined interval between the fixed electrode 13 and the diaphragm 17a, the silicon substrate 17 that is formed in advance with a predetermined thickness of several tens of micrometers by means of etching or polishing is bonded to the bonding surface 11e of the glass substrate 11, as shown in FIG. 4B. The anode bonding process is performed by applying a voltage of about 500 V to the silicon substrate 17 and the glass substrate 11 under heating at the temperature of about 400° C. or less. The adhesiveness at the interface between the silicon substrate 17 and the glass substrate 11 is further improved, and airtightness of the cavity 18 in the capacitive pressure sensor can be improved.

The resist film is formed on an entire region of the silicon substrate 17, the resist film is patterned (subjected to a photolithographic process) such that the resist film remains in a region other than the electrode pad peripheral region, the silicon substrate 17 is etched while using the resist film as a mask, and the remaining resist film is removed. As a result, it is possible to obtain the capacitive pressure sensor shown in FIG. 1A.

In the capacitive pressure sensor that is obtained in the above-mentioned method, the fixed electrode 13 is electrically connected to the electrode pad 16 through the protruding portion 12a, and the diaphragm 17a is electrically connected to a lead electrode (not shown). A signal indicating the variation of the electrostatic capacitance that is detected between the diaphragm 17a and the fixed electrode 13 can be obtained from the electrode pad and the lead electrode. Measured pressure can be calculated on the basis of the obtained signal.

In the capacitive pressure sensor according to the embodiment, the fixed electrode 13 is formed on the protruding portion 11c that is formed in the glass substrate 11. Since the top surface of the protruding portion 11c has a substantially flat surface, regardless of the location of the fixed electrode 13, the gap between the fixed electrode 13 and the movable electrode 17a can be maintained at a predetermined value. As a result, it is possible to detect the pressure with high sensitivity. As described above, according to one embodiment, it is possible to provide a capacitive pressure sensor that is capable of detecting the pressure with high sensitivity.

In one embodiment, the recessed portion lid is formed at a location lower than the protruding portion 11c in the glass substrate 11, and the connecting portion 12c connecting the protruding portions 12a and 12b of the silicon substrate 12 is formed such that its top surface exists at a location lower than the top surfaces of the protruding portions 12a and 12b. The distance between the conductive members other than the fixed electrode 13 and the silicon substrate 17 can be maintained at a large value, and thus the parasitic capacitance can be drastically reduced. For example, in a case in which the height of the protruding portion 11c from the bottom surface of the recessed portion 11d in the region 11g other than the protruding portion 11c is set to about 3 to 6 μm and the height of each of the protruding portions 12a and 12b from the top surface of the connecting portion 12c is about 200 μm, the parasitic capacitance can be set to about 4.3% of the total electrostatic capacitance of the capacitive pressure sensor.

The present embodiments are not limited to the above-described embodiments, and various modifications can be made. For example, the numerical values or material qualities that have been described in the above-described embodiment are not limited. The silicon etching or milling process used in the above-described embodiment is performed according to the commonly used conditions. The processes that have been described in the above-described embodiment are not limited thereto, and the order between the processes may be appropriately varied. Furthermore, various modifications and changes can be made without departing from the scope or spirit of the invention.

According to one embodiment, a capacitive pressure sensor includes a glass substrate that has a pair of principal surfaces opposite to each other, a recessed portion provided to form a cavity on one of the pair of principal surfaces, and a first protruding portion provided in the recessed portion, a fixed electrode that is formed on the first protruding portion, and a first silicon substrate that has a movable electrode disposed with a predetermined interval between the fixed electrode and the movable electrode. Therefore, it is possible to achieve a capacitive pressure sensor that is capable of performing pressure detection with high sensitivity.

The invention claimed is:

1. A capacitive pressure sensor comprising:
   a glass substrate that has a pair of surfaces opposite to each other, a recessed portion provided to form a cavity on one of the pair of principal surfaces, and a first protruding portion provided in the recessed portion; and
   a first silicon substrate that has a fixed electrode formed on the first protruding portion, and a movable electrode disposed with a predetermined interval between the fixed electrode and the movable electrode.

2. The capacitive pressure sensor according to claim 1, further comprising:
   a second silicon substrate that is bonded to the other principal surface of the glass substrate, and has a second protruding portion penetrating the glass substrate to be exposed through the one principal surface,
   wherein the second protruding portion is exposed in a region other than the first protruding portion in the recessed portion, and the fixed electrode is electrically connected to the second protruding portion.

3. The capacitive pressure sensor according to claim 1, wherein an Si—Si bond is generated at the interface between the glass substrate and the first and second silicon substrates.

4. The capacitive pressure sensor according to claim 1, wherein an Si—O bond is generated at the interface between the glass substrate and the first and second silicon substrates.

* * * * *